US009463714B2

(12) United States Patent
Goedert

(10) Patent No.: US 9,463,714 B2
(45) Date of Patent: Oct. 11, 2016

(54) VEHICLE SEAT SUSPENSION MAT

(71) Applicant: IEE INTERNATIONAL ELECTRONICS & ENGINEERING S.A., Echternach (LU)

(72) Inventor: Guenter Goedert, Trier (DE)

(73) Assignee: IEE International Electronics and Engineering S.A., Echternach (LU)

( * ) Notice: Subject to any disclaimer, the term of this patent is extended or adjusted under 35 U.S.C. 154(b) by 0 days.

(21) Appl. No.: 14/404,276

(22) PCT Filed: May 17, 2013

(86) PCT No.: PCT/EP2013/060221
§ 371 (c)(1),
(2) Date: Nov. 26, 2014

(87) PCT Pub. No.: WO2013/178485
PCT Pub. Date: Dec. 5, 2013

(65) Prior Publication Data
US 2015/0137569 A1 May 21, 2015

(30) Foreign Application Priority Data

May 30, 2012 (LU) .......................................... 92012

(51) Int. Cl.
*B60R 21/015* (2006.01)
*B60N 2/00* (2006.01)
(Continued)

(52) U.S. Cl.
CPC ................. *B60N 2/002* (2013.01); *B60N 2/54* (2013.01); *B60N 2/68* (2013.01); *B60N 2/7094* (2013.01);
(Continued)

(58) Field of Classification Search
CPC ...... B60N 2/7094; B60N 2/002; B60N 2/54; B60N 2/68; B60N 21/01524
USPC .......................... 297/217.2, 452.56; 280/735
See application file for complete search history.

(56) References Cited

U.S. PATENT DOCUMENTS 4,869,554 A * 9/1989 Abu-Isa ............... B60N 2/7011
297/452.56 X
5,013,089 A * 5/1991 Abu-Isa ................. A47C 7/282
297/452.56 X
(Continued)

FOREIGN PATENT DOCUMENTS

DE 4212018 A1 10/1992
DE 19752976 A1 6/1998
(Continued)

OTHER PUBLICATIONS

International Search Report and Written Opinion issued Sep. 19, 2013 re: PCT/EP2013/060225; citing: EP 2 450 228 A2, JP 49 132105 U, EP 2 450 229 A2 and EP 1 666 311 B1.
(Continued)

*Primary Examiner* — Rodney B White
(74) *Attorney, Agent, or Firm* — Reising Ethington P.C.

(57) ABSTRACT

A vehicle seat suspension mat (10) comprises one or more suspension springs (16) for supporting a seat cushion (22) and an occupancy sensor module (24) supported by at least one suspension spring. The module includes a first plate (26) having a switch element (38) arranged thereon and a second plate (28) mounted in a cantilevered manner to the first plate, in such a way that the first and second plates form together a pair of jaws, which the switch element is arranged between. The first and second plates are configured so as to move closer together against their resiliency in response to compressive forces acting on the first and second plates.

14 Claims, 2 Drawing Sheets

(51) Int. Cl.
  *B60N 2/70* (2006.01)
  *B60N 2/54* (2006.01)
  *B60N 2/68* (2006.01)
  *G01L 1/22* (2006.01)
  *H01H 13/702* (2006.01)
  *H01H 13/705* (2006.01)

(52) U.S. Cl.
  CPC ........... *B60R 21/01524* (2014.10); *G01L 1/22* (2013.01); *H01H 13/702* (2013.01); *H01H 13/705* (2013.01)

(56) References Cited

U.S. PATENT DOCUMENTS

| | | | | |
|---|---|---|---|---|
| 5,439,271 | A | * | 8/1995 | Ryan .................. B60N 2/68 297/452.56 X |
| 5,884,977 | A | * | 3/1999 | Swamy ............... B60N 2/70 297/284.2 |
| 5,984,349 | A | * | 11/1999 | Van Voorhies ....... B60N 2/002 297/217.2 X |
| 6,056,079 | A | * | 5/2000 | Cech .................. B60N 2/002 297/217.2 X |
| 6,070,942 | A | * | 6/2000 | Barton ................ A47C 4/54 297/452.41 X |
| 6,213,557 | B1 | * | 4/2001 | Aebischer ........... A47C 7/185 297/452.56 X |
| 6,360,618 | B2 | * | 3/2002 | Anahid ............... 177/144 |
| 6,419,313 | B1 | * | 7/2002 | Newman ............. B60N 2/70 296/37.15 |
| 6,719,368 | B1 | * | 4/2004 | Neale ................. B60N 2/42727 297/216.12 |
| 7,275,793 | B2 | * | 10/2007 | Fujita ................. A47C 31/006 297/452.56 X |
| 7,416,256 | B2 | * | 8/2008 | Fujita ................. B60N 2/502 297/452.56 X |
| 7,618,096 | B2 | * | 11/2009 | Fujita ................. B60N 2/4415 297/452.56 |
| 8,063,788 | B1 | * | 11/2011 | Morningstar ........ B60N 2/002 180/271 |
| 8,328,276 | B2 | * | 12/2012 | Inayoshi ............. B60N 2/002 297/217.2 X |
| 8,973,989 | B2 | * | 3/2015 | Oman ................. B60N 2/002 297/217.2 |
| 2003/0033885 | A1 | | 2/2003 | Knox et al. |
| 2003/0047974 | A1 | * | 3/2003 | Tame ................. B60N 2/34 297/283.3 |
| 2004/0108755 | A1 | * | 6/2004 | Neale ................. B60N 2/01541 297/15 |
| 2005/0168046 | A1 | * | 8/2005 | Hadi .................. B60N 2/5685 297/463.2 |
| 2005/0253442 | A1 | * | 11/2005 | Huse .................. A47C 27/16 297/452.1 |
| 2008/0164732 | A1 | * | 7/2008 | Valasin ............... B60N 2/01583 297/216.13 |
| 2008/0191524 | A1 | * | 8/2008 | Takai .................. B60N 2/002 297/217.2 |
| 2009/0051198 | A1 | * | 2/2009 | Ishikawa ............. B60N 2/002 297/217.2 |
| 2010/0207431 | A1 | * | 8/2010 | Petzel ................. B60N 2/4415 297/217.3 X |
| 2010/0244504 | A1 | * | 9/2010 | Colja .................. A61H 9/0078 297/217.3 X |
| 2010/0295563 | A1 | | 11/2010 | Bieck et al. |
| 2011/0248534 | A1 | * | 10/2011 | Pinto Ribeiro ...... B60N 2/7094 297/217.1 |
| 2012/0299605 | A1 | | 11/2012 | Wakabayashi et al. |
| 2013/0313876 | A1 | * | 11/2013 | Perrin ................. B60N 2/24 297/344.13 |
| 2014/0246887 | A1 | | 9/2014 | Clos et al. |
| 2015/0008709 | A1 | * | 1/2015 | Erhel ................. B64D 11/0636 297/217.2 |
| 2015/0123436 | A1 | * | 5/2015 | Boyer ................. B60N 2/646 297/217.2 |
| 2015/0137568 | A1 | * | 5/2015 | Boyer ................. B60N 2/7094 297/217.1 |
| 2015/0137569 | A1 | | 5/2015 | Goedert |
| 2015/0143927 | A1 | | 5/2015 | Goedert et al. |
| 2015/0283923 | A1 | * | 10/2015 | Kordel ............... B60N 2/7094 297/452.49 |

FOREIGN PATENT DOCUMENTS

| | | | |
|---|---|---|---|
| DE | 10145370 | A1 | 12/2002 |
| DE | 202010003563 | U1 | 8/2010 |
| EP | 1666311 | B1 | 1/2009 |
| EP | 2450228 | A2 | 5/2012 |
| EP | 2450229 | A2 | 5/2012 |
| FR | 2937291 | A1 | 4/2010 |
| JP | 49132105 | U | 11/1974 |
| WO | 2004089687 | A1 | 10/2004 |
| WO | 2012053619 | A1 | 4/2012 |
| WO | WO 2013/167505 A1 * | 11/2013 | ........... B60N 2/7094 |

OTHER PUBLICATIONS

International Search Report and Written Opinion issued Sep. 5, 2013 re: PCT/EP2013/060221; citing: WO 2004/089687 A1, DE 101 45 370 A1 and DE 42 12 018 A1.

International Search Report and Written Opinion issued Sep. 5, 2013; re: PCT/EP2013/060227; citing: WO 2012/053619 A1, EP 2 450 228 A2 and FR 2 937 291 A1.

* cited by examiner

VEHICLE SEAT SUSPENSION MAT

TECHNICAL FIELD

The present invention generally relates to the field of vehicle seats. In particular, the invention relates to a vehicle seat suspension mat.

BACKGROUND ART

Seat occupancy sensors are nowadays widely used in automotive vehicles to provide a seat occupancy signal for various appliances, such as, e.g. a seat belt reminder, an auxiliary restraint system (airbag), etc. The possibility of customization and personalization of the vehicle by the customer is a key selling factor of modern cars. This leads to many different variants of car interiors being offered for one car model. With the increasing number of available options, severe constraints arise concerning the implementation of technical equipment in the vehicle. With seat occupancy sensors arranged between the foam body of the seat cushion and the seat cover, every seat design (leather, cloth, sport, comfort, . . . ) requires specific development effort for the occupant detection system. That induces high development costs and therefore is an unattractive solution for the automotive industry. A problem to be solved is, therefore, to find a sensor solution, which is less influenced by seat design and thus can be used for a greater variety of car seats or even car platforms.

Document DE 197 52 976 A1 discloses vehicle seat suspension mat, comprising an occupancy sensor in the shape of a film-type pressure sensor. The pressure sensor includes a first carrier film, a spacer and a second carrier film, which are disposed on one another in the manner of a sandwich. Contact elements are arranged on the inner surfaces of the carrier films. An opening in the spacer allows the contact elements to get into contact with each other when pressure is applied on the sensor. The pressure sensor is arranged inside a cavity on the bottom side of the foam cushion of the vehicle seat. The pressure sensor is supported by a foam block, which closes the cavity and which rests on the seat pan.

Document DE 20 2010 003 563 U1 discloses a vehicle seat suspension mat, comprising a film-type pressure sensor. The pressure sensor includes two films maintained at a distance by a spacer material arranged there between. The pressure sensor is disposed on a compressible intermediate layer, which is, in turn arranged on a base plate.

A drawback of the vehicle seat suspension mats of the documents DE 197 52 976 A1 and DE 20 2010 003 563 U1 resides in the fact that it is necessary to adapt the characteristics of the pressure sensor for each reference of seat.

BRIEF SUMMARY

The present invention provides a vehicle seat suspension mat that is adaptable to different reference of seat without need to modify the pressure sensor.

A vehicle seat suspension mat in accordance with an aspect of the invention comprises one or more suspension springs for supporting a seat cushion and an occupancy sensor module supported by at least one of the one or more suspension springs. The occupancy sensor module includes a first plate having a switch element arranged thereon and a second plate mounted in a cantilevered manner to the first plate, in such a way that the first and second plates form together a pair of jaws, which the switch element is arranged between. The first and second plates are configured so as to move closer together against their resiliency in response to compressive forces acting on the first and second plates.

The mechanical properties (such as e.g. thickness, modulus of elasticity, dimensions etc.) of the first and second plates are selected in such a way that the switch element is activated when the compressive forces exceeds a predefined threshold. The threshold corresponds to the weight exerted on the seat above which the seat is detected occupied, i.e. the occupancy state is "occupied". The threshold may e.g. be selected such that a $5^{th}$ percentile female or heavier occupant of the seat is reliably detected. A different threshold may be chosen in accordance with the needs of the application (e.g. seat belt reminder, airbag control system, etc.)

As will be appreciated, the suspension mat is little or not influenced by the design of seat parts that can be readily perceived by the user (such as e.g. the shape of the cushion and the upholstery of the seat). For a particular car model, the suspension mat is normally defined only once, namely at the moment of the seat design. The suspension mat being a part of a car's passive safety concept, it will not be changed after the passive safety concept of a vehicle has been defined. As this happens at an early stage in the development of a car model, the car manufacturer has more time for making adjustments in the outer design of the seat, if necessary, than with an occupancy sensor arranged between the seat cushion and the trim.

The first and second plates are preferably made of a single piece of material, e.g. plastic, in particular injection-molded plastic.

According to a preferred embodiment of the invention, the switch element is part of a pressure-responsive membrane switch. Such pressure-responsive membrane switch preferably comprises a first carrier film and a second carrier film spaced from each other by a spacer film, the spacer film having therein an opening defining a pressure-sensitive cell (representing the switch element), the pressure-responsive membrane switch comprising at least two electrodes arranged in facing relationship with each other in the cell on the first and the second carrier film, respectively, in such a way that they are brought closer together, possibly into contact with each other, when pressure is applied on the pressure-responsive membrane switch.

The occupancy sensor module preferably comprises one or more fixation elements (such as, e.g. clips or clamps) by means of which the occupancy sensor module is attached to the at least one of the one or more suspension springs. The fixation element(s) may be integrally formed with the first and second plates. The one or more fixation elements could be arranged on the first plate or the second plate.

According to a preferred embodiment of the invention, a detection circuit is connected to the switch element for detecting whether the switch element is compressed by the first and second plates.

The occupancy sensor module may comprise a third plate mounted in a cantilevered manner to the first plate and a second switch element arranged between the first and third plates. In this case, the first and third plates are configured to form together a second pair of jaws and to move closer together against their resiliency to compressive forces acting on the first and third plates. The second switch element may be of the same configuration as the first switch element.

The third plate may have arranged thereon one or more fixation elements by means of which the occupancy sensor module is attached to the at least one of the one or more suspension springs.

An aspect of the invention concerns a vehicle seat comprising a seat frame, a vehicle seat suspension mat as described hereinbefore, taut on the seat frame and a seat cushion supported by the vehicle seat suspension mat.

BRIEF DESCRIPTION OF THE DRAWINGS

Preferred embodiments of the invention will now be described, by way of example, with reference to the accompanying drawings, in which.

For sake of clarity, the drawings are nor to scale. The different elements of each figure are thus not necessarily shown in proper proportion.

DESCRIPTION OF PREFERRED EMBODIMENTS

Figure 1:
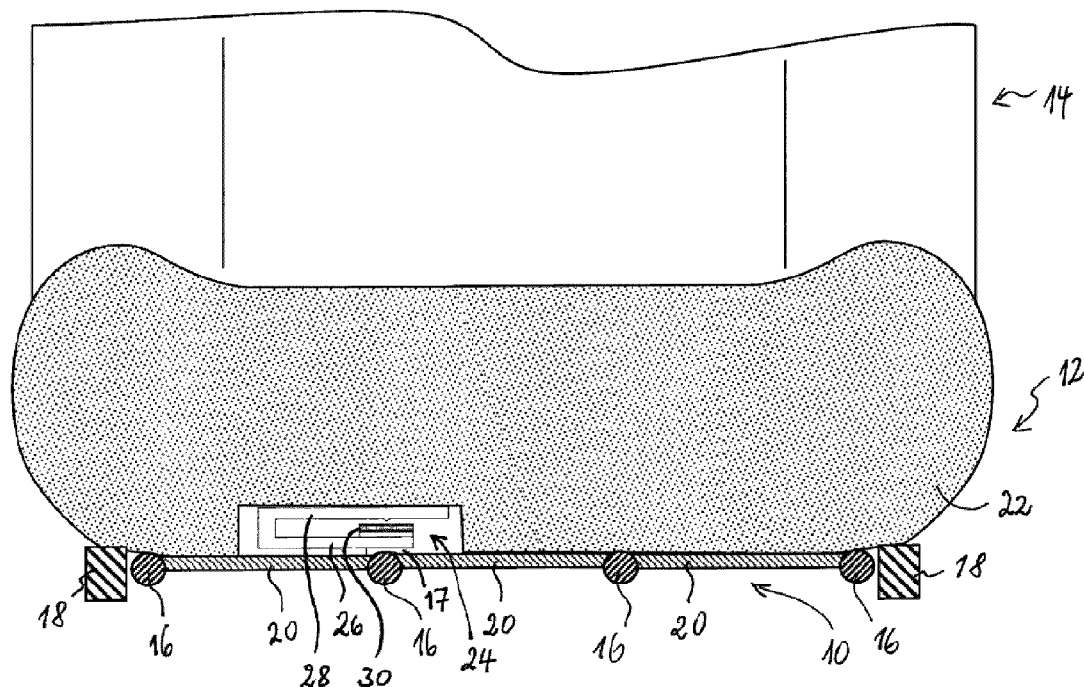
FIG. 1 is a transversal cross sectional view of the seating portion of a vehicle seat including a seat suspension mat according to a preferred embodiment of the invention.

A vehicle seat suspension mat 10 according to a first preferred embodiment of the invention is shown in FIG. 1. The suspension mat 10 is part of a seating portion 12 of a vehicle seat 14. The suspension mat comprises a plurality of suspension springs 16 (e.g. made of steel wire) taut between fixation sites (not shown) of the structural frame 18 of the vehicle seat 14. The suspension springs 16 are flexibly linked to each other by plastic cross-ties 20. The suspension mat 10 supports the seat cushion 22 of the vehicle seat 14. The suspension mat 10 further includes a seat occupancy detector 24 that is responsive to the weight of a seat occupant.

Figure 2:
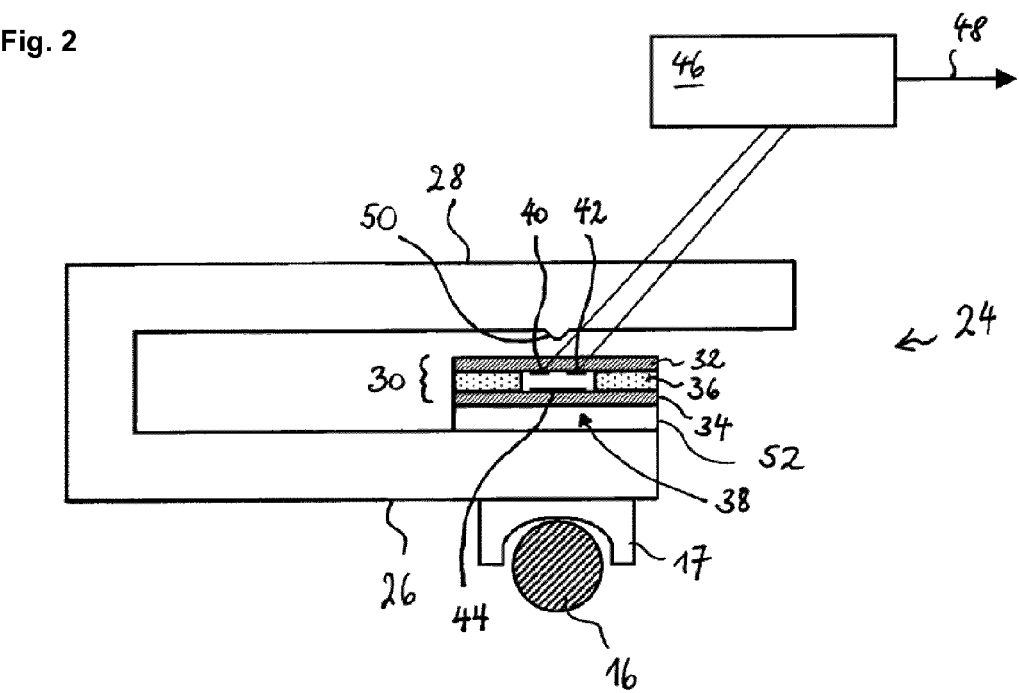
FIG. 2 shows a detail of FIG. 1.

The seat occupancy sensor module 24 is clipped on a suspension spring 16 by a fixation element or clip 17. As best illustrated in FIG. 2, the seat occupancy sensor module 24 comprises a first 26 and a second plate 28 mounted in cantilevered manner on the first plate 26. The first and second plates 26, 28 are made of injection-molded plastic and form together a pair of jaws. A pressure-responsive membrane switch 30, is arranged opposite the second plate 28 on the first plate 26.

The pressure-responsive membrane switch 30 comprises a first carrier film 32 and a second carrier film 34 spaced from each other by a spacer film 36. The spacer film 36 has therein an opening defining a pressure-sensitive cell 38 (switch element). In the cell 36, a first electrode 40 and a second electrode 42 are arranged on the first carrier film, in facing relationship with a third electrode 44 on the second carrier film 34.

The first and second electrodes 40, 42 are connected to a detection circuit 46 that detects whether the first and second electrodes 40, 42 are shunted by the third electrode 44. The detection circuit may e.g. be a microcontroller or an application-specific integrated circuit (ASIC). The detection circuit 46 comprises an output 48 for providing a signal indicative of whether the electrodes 40, 42, 44 are in contact or not. The detection circuit 46 detects a contact between the three electrodes 40, 42, 44 as a drop in resistance. The drop of resistance may be determined from an increase of current or a drop in voltage, depending on the configuration of the detection circuit 46.

As shown in FIG. 1, the seat occupancy sensor module 24 is maintained between the seat cushion 22 and at least one of the suspension springs 16. When the seat is occupied, the seat occupancy sensor module 24 experiences part of the weight of the occupant and part of the reaction force of the suspension springs 16. These compressive forces push the first and second plates 26, 28 toward each other. When sufficient load is applied on the seating portion 12, the first and second plates squeeze the pressure-responsive membrane switch 30, whereby the electrodes 40, 42, 44 therein are brought into electrical contact. The mechanical properties of the seat occupancy sensor module 24 are selected such that a predetermined minimum load on the seating portion 12 reliably results in the activation of the membrane switch 30 (i.e. in the electrodes 40, 42, 44 being brought into electrical contact with one another). The signal output by the evaluation circuit 46 thus indicates whether the seat is occupied or empty.

The sensitivity of the seat occupancy sensor module 24 may be adjusted in numerous ways in order to achieve the desired activation threshold. As illustrated in FIG. 2, the second plate 28 may comprise a stud 50 arranged facing the pressure-responsive membrane switch 30. The stud 50 serves to concentrate the application of force on the pressure-sensitive cell 38. The dimensions (height, diameter etc.) of the stud 50 may be chosen in accordance with the desired activation threshold. FIG. 2 also shows that the pressure-responsive membrane switch 30 may be arranged on a base 52, whereby the distance between the pressure-responsive membrane switch 30 and the second plate 28 is reduced. The base 52 may be integrally formed with the first plate 26. Alternatively, the base 52 could comprise a layer of compressible material (e.g. polyurethane or other foam).

Figure 3:
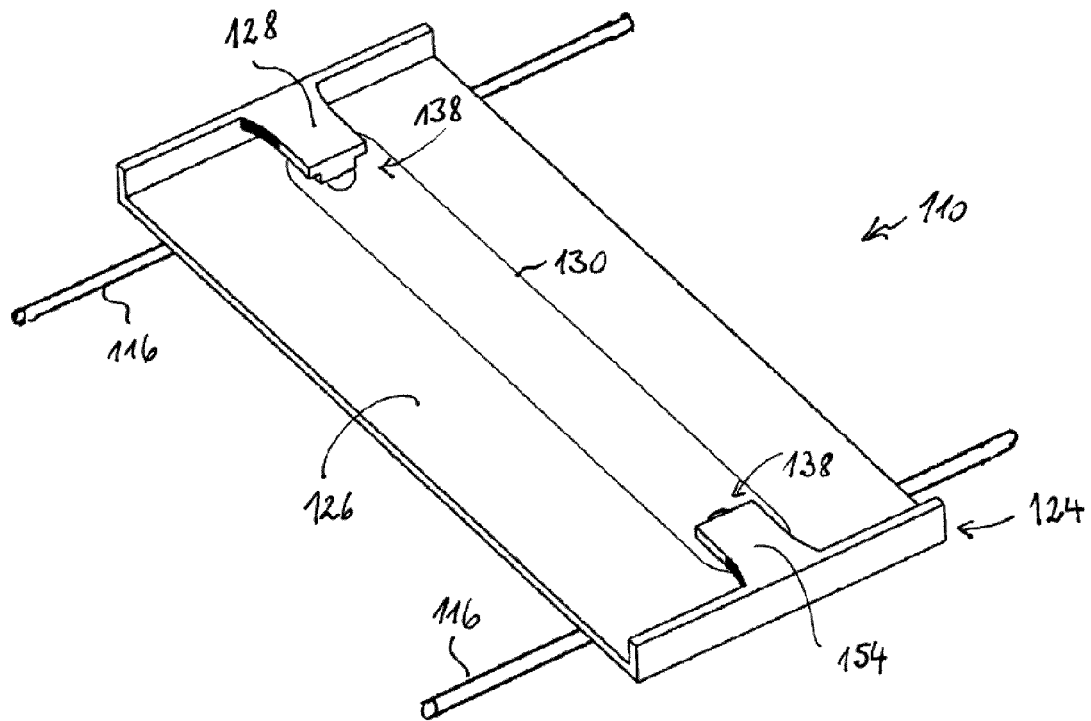
FIG. 3 is a perspective view of a variant of a vehicle seat suspension mat according to the invention.

FIG. 3 shows a vehicle seat suspension mat 110 according to a further preferred variant of the invention. The seat suspension mat 110 comprises a plurality of suspension springs 116 and an occupancy sensor module 124 fixed to a pair of neighboring suspension spring 116 in the manner of a cross-tie. The occupancy sensor module 124 comprises a first plate 126 carrying a film-type pressure-sensor (pressure sensitive membrane switch) 130. A second plate 128 and a third plate 154 are mounted respectively in cantilevered manner on the first plate 126, each in facing a respective pressure-sensitive cell 136 of the film-type pressure-sensor 130. The configuration of the first and second plates 126, 128 is the same as that of the first and third plates 126, 154. The function of the occupancy sensor module 124 is otherwise the same as that of the occupancy sensor module described above with reference to FIGS. 1 and 2.

Figure 4:
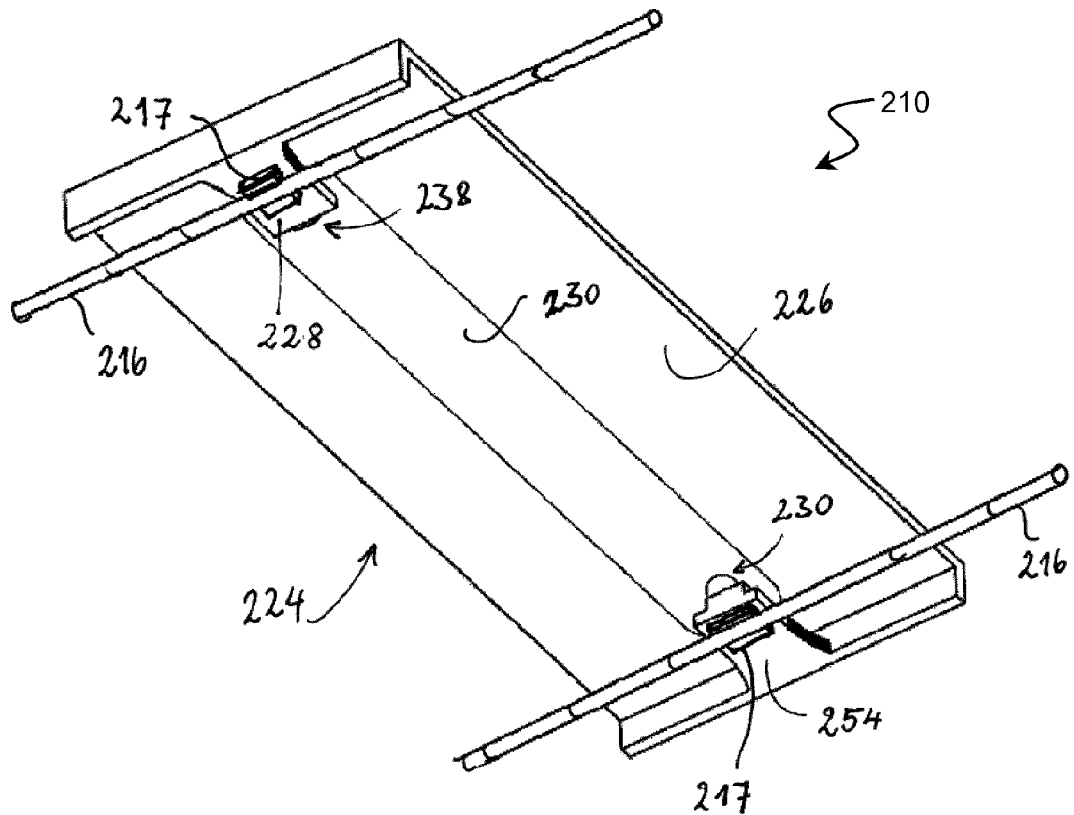
FIG. 4 is a perspective view of another variant of a vehicle seat suspension mat according to the invention.

FIG. 4 shows yet a further variant of a vehicle seat suspension mat according to the invention. The pressure sensor mat 210 comprises a plurality of suspension springs 216 and an occupancy sensor module 224 fixed to a pair of neighboring suspension spring 216 in the manner of a cross-tie. The occupancy sensor module 224 comprises a first plate 226 having a film-type pressure-sensor 230 applied against its bottom. A second plate 228 and a third plate 254 are mounted respectively in cantilevered manner on the first plate 226, each in facing a respective pressure-sensitive cell 238 of the film-type pressure-sensor 230. The configuration of the first and second plates 226, 228 is the same as that of the first and third plates 226, 254. Fixation elements 217 for fixing the occupancy sensor module 224 to the suspension springs. 216 are arranged on the bottom surfaces of the second and third plates 228, 254. When integrated into a vehicle seat, the top surface of the first plate 226 is applied against the bottom surface of the seat cushion.

The function of the occupancy sensor module 224 is otherwise the same as that of the occupancy sensor module described above with reference to FIGS. 1 and 2.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A vehicle seat suspension mat, comprising:
   one or more suspension springs for supporting a seat cushion;
   an occupancy sensor module supported by at least one of said one or more suspension springs, said occupancy sensor module including
      a first plate; and
      a switch element arranged on said first plate;
   wherein said occupancy sensor module comprises a second plate mounted in a cantilevered manner on said first plate, in such a way that said first and second plates form together a pair of jaws, which said switch element is arranged between, said first and second plates being configured so as to move closer together against a resiliency provided by said first and second plates in response to compressive forces acting on said first and second plates.

2. Vehicle seat suspension mat as claimed in claim 1, wherein said first and second plates are made of a single piece of material.

3. Vehicle seat suspension mat as claimed in claim 2, wherein said single piece of material is a single piece of plastic.

4. Vehicle seat suspension mat as claimed in claim 1, wherein said switch element is part of a pressure-responsive membrane switch.

5. Vehicle seat suspension mat as claimed in claim 4, wherein said pressure-responsive membrane switch comprises a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch.

6. Vehicle seat suspension mat as claimed in claim 1, wherein said occupancy sensor module comprises one or more fixation elements with which said occupancy sensor module is attached to said at least one of said one or more suspension springs.

7. Vehicle seat suspension mat as claimed in claim 6, wherein said one or more fixation elements are arranged on said first plate.

8. Vehicle seat suspension mat as claimed in claim 6, wherein said one or more fixation elements are arranged on said second plate.

9. Vehicle seat suspension mat as claimed in claim 1, comprising a detection circuit connected to said switch element for detecting whether said switch element is compressed by said first and second plates.

10. A vehicle seat suspension mat as claimed in claim 1, wherein said occupancy sensor module comprises
    a second switch element and
    a third plate mounted in a cantilevered manner to said first plate, in such a way that said first and third plates form together a second pair of jaws, which said second switch element is arranged between, said first and third plates being configured so as to move closer together against a resiliency thereof in response to compressive forces acting on said first and third plates.

11. A vehicle seat suspension mat as claimed in claim 10, wherein said switch element and said second switch element are of the same configuration.

12. Vehicle seat suspension mat as claimed in claim 10, wherein said third plate has arranged thereon one or more fixation elements by means of which said occupancy sensor module is attached to said at least one of said one or more suspension springs.

13. Vehicle seat comprising
    a seat frame;
    a vehicle seat suspension mat as claimed in claim 1, taut on said seat frame; and
    a seat cushion supported by said vehicle seat suspension mat.

14. A vehicle seat suspension mat, comprising:
    one or more suspension springs for supporting a seat cushion;
    an occupancy sensor module supported by at least one of said one or more suspension springs, said occupancy sensor module including
       a first plate; and
       a switch element arranged on said first plate;
    wherein said occupancy sensor module comprises a second plate mounted in a cantilevered manner on said first plate, in such a way that said first and second plates form together a pair of jaws, which said switch element is arranged between, said first and second plates being configured so as to move closer together against a resiliency thereof in response to compressive forces acting on said first and second plates;
    wherein said first and second plates are made of a single piece of material; and
    wherein said single piece of material is a single piece of plastic.

* * * * *